Figure 1:
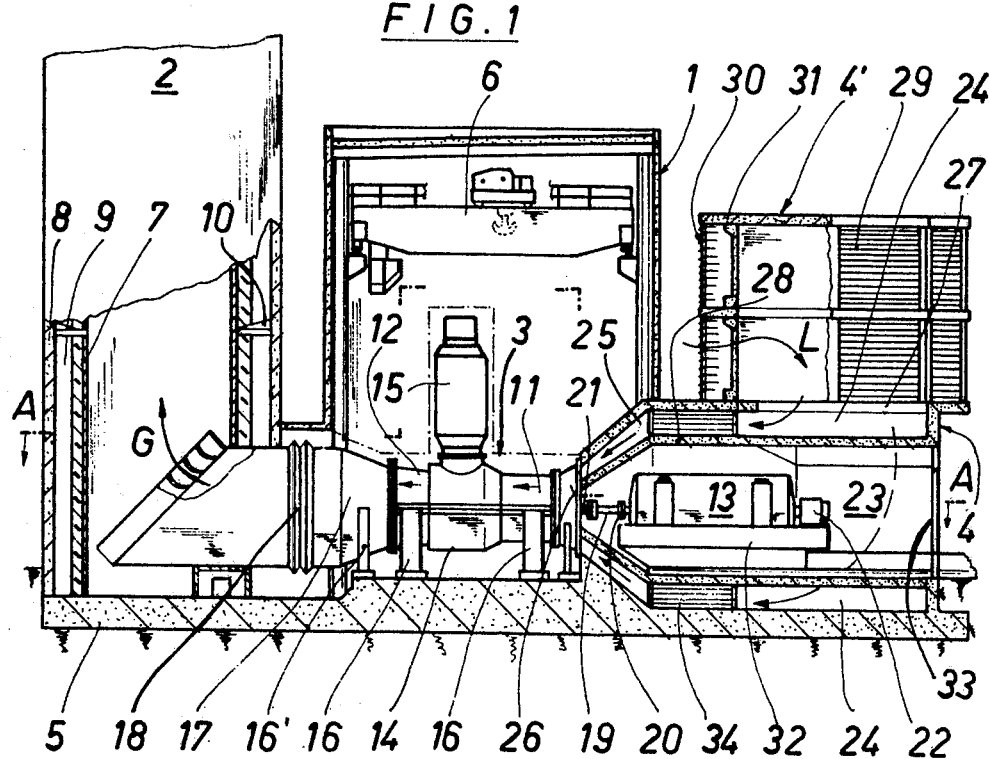

United States Patent [19]

Hartmann

[11] 4,002,023
[45] Jan. 11, 1977

[54] STATIONARY POWER-GENERATING PLANT

[75] Inventor: Max Hartmann, Baden, Switzerland

[73] Assignee: Brown Boveri-Sulzer Turbomaschinen AG, Zurich, Switzerland

[22] Filed: Mar. 25, 1975

[21] Appl. No.: 561,694

[30] Foreign Application Priority Data

Apr. 9, 1974  Switzerland ............... 4980/74

[52] U.S. Cl. ...................... 60/39.31; 60/39.33; 290/52; 415/219 R
[51] Int. Cl.[2] ............................ F02C 7/20
[58] Field of Search ....... 60/39.31, 39.33, 39.09 P; 137/15.1, 15.2; 290/52; 415/119, 219 R

[56] References Cited

UNITED STATES PATENTS

| | | | |
|---|---|---|---|
| 2,358,301 | 9/1944 | Brauns | 290/52 |
| 2,441,135 | 5/1948 | Chalupa | 60/39.31 |
| 3,481,427 | 12/1969 | Dobbs et al. | 415/119 |
| 3,829,237 | 8/1974 | Chestnut | 415/181 |
| 3,859,785 | 1/1975 | Leto et al. | 60/39.33 |
| 3,871,844 | 3/1975 | Calvin | 60/39.09 P |

FOREIGN PATENTS OR APPLICATIONS 703,645  2/1954  United Kingdom ........... 60/39.33

Primary Examiner—Carlton R. Croyle
Assistant Examiner—Louis J. Casaregola
Attorney, Agent, or Firm—Pierce, Scheffler & Parker

[57] ABSTRACT

A stationary power-generating plant of the type which includes a turboset comprising an axial-flow combustion gas turbine, an axial flow combustion air compressor and a driven machine such as an electrical generator which are all coupled together and mounted for rotation about a common axis. The driven machine is located within a hollow chamber surrounded by an intake duct which provides for a flow of combustion air to the compressor and the intake duct is arranged coaxially with the rotational axis of the turboset and is connected to the air inlet end of the compressor by means of a convergent conical annular duct thereby providing axial flow of air to the compressor inlet.

2 Claims, 3 Drawing Figures

STATIONARY POWER-GENERATING PLANT

This invention concerns an improvement in a stationary power-generating plant with a turboset of axial construction comprising an axial flow compressor, an axial flow gas turbine and a driven machine such as an electrical generator, all mounted on a common shaft, and the driven machine being coupled to the air intake end of the compressor shaft.

In the case of gas turbines for power stations, but also in industry, the driven machine is usually coupled to the free end of the compressor shaft. If flow through the gas turbine is in the axial direction, the driven machine, whether it is a pump, electric generator or other form of machine, necessitates radial air intakes to the combustion air compressor of the power plant.

The radial, and hence mostly asymmetrical, flow of combustion air to the compressor has an unfavourable influence on the efficiency of the turboset and the performance of the compressor. These influences become more marked with increasing air velocities, as does the tendency for the blades to vibrate.

Because the incoming radial flow of air has to be diverted into the axial direction, the overall length of the machine is greatly influenced by the configuration of the intake duct. Owing to the length of the intake duct, made necessary by aerodynamic considerations, it is usually not possible to influence favourably the smooth running of the turbine. With power-generating plants of increasing unit capacity these features become more significant because, with increasing inlet temperature and higher pressure ratio, the size of the intake duct increases more than proportionately to the other dimensions of the machine.

The axial inlet flow customary with aircraft engines would provide a suitable solution to the problem described above. In the case of gas-turbine plants driving generators, etc., however, this solution can be applied only if the driven machine is coupled to the exhaust end of the turbine shaft. However, this presents further problems because the axial-flow exhaust diffusor, which has a beneficial influence on efficiency, has to be changed over into a radial-flow device which then gives rise to large losses. Furthermore, the exhaust stack must be positioned between the driven machine and the gas turbine. This arrangement seriously interferes with the planning of the power plant building because the layout of the auxiliaries such as crane or waste heat boiler inevitably requires the use of more space and materials.

The object of the present invention is to provide an axial flow of air to the compressor of a stationary gas-turbine plant without sacrificing the axial flow type exhaust-gas diffusor necessary to achieve high efficiency.

This object is achieved in that the driven machine is located in a hollow chamber surrounded by an intake duct for the air to the compressor, the intake duct being arranged coaxially with the shaft of the turboset and joined by a conical annular duct to the inlet in the compressor casing.

Apart from the improvement in quietness, already known in connection with aero engines, brought about by an axial, and at the same time symmetrical, flow of combustion air to the compressor, and the fact that capacity is unaffected, a plant of this configuration has the following advantages:

The driven machine located in the chamber formed by the double-walled air intake duct is automatically provided with acoustic insulation, and if erected outdoors is at the same time protected against the weather, because the intake duct effectively acts as a building for the machine.

The space previously provided in the power plant building for the enclosure of the driven machine and the air intake manifold is now combined into one and forms a compact unit, the space requirement of which has in total been reduced and in addition allows savings of space and materials in the power plant building.

The elevated position of the air intake desirable with stationary gas-turbine plants to prevent or reduce dirt deposits in the compressor, is possible at no extra cost by simply placing the filter unit on the top of the generator building.

When inspecting or servicing the turboset such as, for example, the compressor, there is no longer any need to dismantle the air intake system, which nevertheless is easily accessible.

In a particular embodiment of the invention silencer panels are located in the intake duct. This has the advantage of further reducing the space requirement and, owing to the relatively larger cross-section area of the intake duct, allows a reduction of air velocity. This, in turn, has a favorable influence on the possibilities of reducing noise.

In another embodiment of the invention the intake duct is at least partly integrated with the foundation of the turboset such as that of the driven machine. This has the effect of simplifying erection since, when using the prefabricated-assembly type of construction, only a small number of units have to be joined together in order to set up a power plant.

Figure 2:
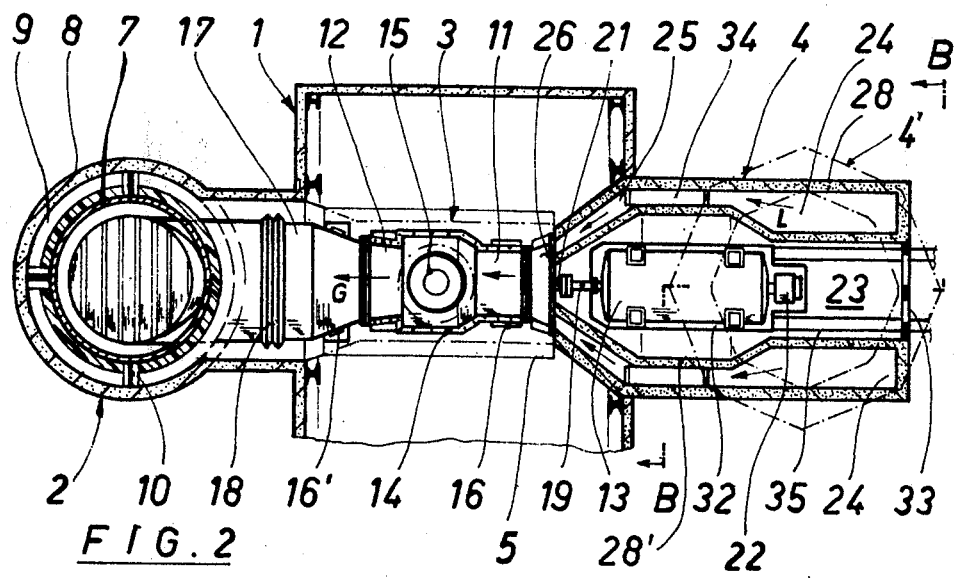
Figure 3:
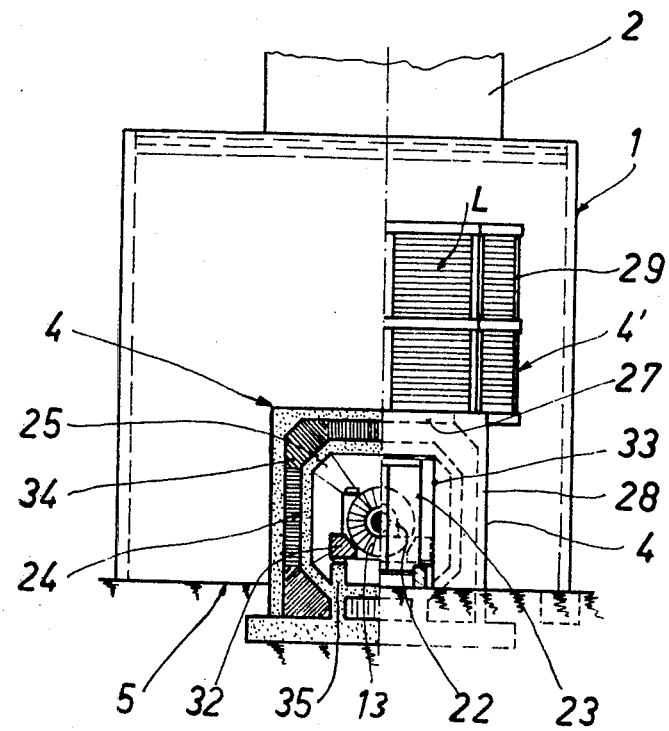

A power plant in accordance with the invention will now be described in more detail with reference to the accompanying drawings, in which:

FIG. 1 shows a section through the power plant parallel to the axis of the gas turbine, FIG. 2 shows a section at line A—A in FIG. 1 and viewed in the direction of the arrows, and FIG. 3 shows a section at line B—B in FIG. 2 and viewed in the direction of the arrows.

Corresponding parts in the different views in the drawings are identified by the same reference symbols.

FIG. 1 shows an indoor power-generating plant, the turbo set 3 of which is contained in the power station building 1. The stack 2 and the generator building 4, which at the same time constitutes the air intake structure 4', are arranged on a common foundation 5 with the power station building 1.

The power station building 1 incorporates a mounting crane 6 which is supported on the outer wall of the building. The stack 2 comprises an inner insulated pipe 7 for the exhaust gases and a surrounding wall structure 8. Between the insulated pipe 7 and the surrounding wall structure 8 is an annular gap 9 which improves ventilation and cooling of the stack 2. The annular gap 9 also contains the supports 10 for the insulated pipe 7.

The turboset 3 comprises an axial flow combustion-air compressor 11, an axial flow gas turbine 12 and a generator 13 functioning as the driven machine. The combustion chamber 15 is placed vertically on a common casing 14 of the gas turbine 12 and the compressor 11, casing 14 being supported on foundation 5 by way of pendulum supports 16.

The axial exhaust gas diffusor 17 from turbine 12 connected to casing 14 is similarly supported on foundation 5 via pendulum supports 16' and is joined by way of a flexible connector 18 to the insulated pipe 7 of the stack 2.

The generator 13 is located at the intake end of the air compressor 11. It is joined to the drive shaft 21 of the turboset 3 via an intermediate shaft 19 and couplings 20. The auxiliary machines, e.g. starter motor 22, are connected to the free end of the generator rotor (not shown). The generator 13 and the auxiliary machines 22 are contained in the generator building itself 4. This comprises essentially the intake duct 24, formed by spaced walls 28, 28', which surrounds the chamber 23 containing the generator 13. As shown in FIG. 1, the lower portion of the annular air intake duct 24 formed by the spaced walls 28, 28', located beneath the generator is integrated into, i.e., it is formed within the foundation 5.

Viewed in the direction of the air flow (arrow L), the intake duct 24 connects to a conical annular duct 25 which is joined to the intake manifold 26 at the compressor end of the casing 14. The intake 24 contains the silencer panels 34.

On the upper side of the generator building 4 the outside wall is provided with an opening 27 to the intake duct 24, the air intake structure 4' and air filter 29 being located over this opening 27. The filter 29 is a multi-sided one and comprises a numberr of filter side panels 30 and chambers 31 through which the air flows horizontally and passes downwardly into the intake duct 24.

FIG. 2 shows a longitudinal section of the power plant, the turboset 3 being shown in top elevation for simplicity. The generator building 4 is formed by the intake duct 24 established by its bounding walls 28 and 28'. In the chamber 23 between walls 28 and 28', the generator is mounted on a plinth 32 which is rigidly fixed to the foundation 5.

The chamber 23 can be entered via a removable bulkhead 33, making it easy to carry out maintenance on the generator 13. The generator 13 is brought in via this bulkhead 33 and coupled to the drive shaft 21 by means of intermediate shaft 19.

As can be seen from the plan view, in the case of turbosets 3 installed in a building, the building dimensions can be reduced by at least the length of the generator 13, which is of benefit as regards both utilisation of space and the layout of the auxiliaries, such as the crane 6.

Owing to the large cross-section areas automatically made available for the intake duct by the compact construction, optimum use can be made of the air filtering and silencing systems with account taken of the flow resistance, both aerodynamically and in terms of acoustic insulation.

The drawn in air flows at relatively low velocity into the intake duct 24, is uniformly straightened by the silencer panels 34 contained in the duct, and passes to the intake manifold 26 on casing 14 via the conical annular duct 25. Since the annular duct 25 is preferably arranged axially symmetrical to the axis of the compressor shaft, uniform inlet flow in the axial direction is assured.

In FIG. 3, the left-hand half shows a section through the generator building 4, while the right-hand half shows an end elevation of the power-generating plant. Behind the power station building 1 is the stack 2, which stands on the foundation 5 together with the turboset 3 and the generator building 4. The lower part of the intake duct 24 is integrated with the foundation 5. The plinth 32 of generator 13 is joined to the foundation 5 via ribs 35 extending through the intake duct 24. The air filter 29 is mounted on the generator building 4. The silencer panels 34 arranged in the intake duct 34 are shown only in part, although they fully occupy the cross-section of the intake duct 24 ahead of the annular duct 25.

I claim:

1. A stationary power-generating plant comprising a foundation, a building structure on said foundation and which houses a casing supported on said foundation, said casing enclosing an axial flow compressor shaft-connected to an axial flow gas turbine, a combustion chamber upstanding on said casing intermediate said compressor and turbine, an axial flow exhaust gas diffusor supported on said foundation and connected to said casing at the discharge side of said turbine, an upright exhaust gas stack connected to the discharge side of said diffusor, an electrical generator mounted on said foundation and shaft-connected to said compressor at the air inlet side thereof and which receives the principal useful power output from said turbine, said building structure including a pair of spaced walls extending longitudinally of and surrounding said generator and which establish therebetween an annular air intake duct for flow of air to said compressor, the lower part of said annular duct beneath the generator being incorporated within the foundation, said air intake duct being located co-axially with the axis of said compressor and being connected to the inlet end of the latter by means of a convergent conical annular duct, and an air filter structure mounted above said building structure, the filtered air flowing downwardly from the filter outlet through an opening into said annular air intake duct and being turned into a horizontal flow through said duct into the compressor inlet.

2. A stationary power-generating plant as defined in claim 1 wherein said air filter is constituted by a multi-sided structure each side of which includes a filter panel through which air flows into the interior and then passes downwardly.

* * * * *